US006978987B2

(12) United States Patent
Kanjee

(10) Patent No.: US 6,978,987 B2
(45) Date of Patent: Dec. 27, 2005

(54) PORTABLE LOCATOR FOR ASSEMBLY OF TRUSSES

(75) Inventor: Manish C. Kanjee, O'Fallon, MO (US)

(73) Assignee: Mitek Holdings, Inc., Wilmington, DE (US)

( * ) Notice: Subject to any disclaimer, the term of this patent is extended or adjusted under 35 U.S.C. 154(b) by 126 days.

(21) Appl. No.: 10/680,657

(22) Filed: Oct. 7, 2003

(65) Prior Publication Data

US 2005/0073079 A1 Apr. 7, 2005

(51) Int. Cl.[7] .................................................. B23Q 3/00
(52) U.S. Cl. ......................................... 269/37; 269/910
(58) Field of Search .......................... 269/37, 303, 304, 269/99, 43, 40, 910; 29/281.1, 281.3, 897.31, 29/559; 227/152, 154, 155; 100/913, 295, 100/100

(56) References Cited

U.S. PATENT DOCUMENTS

| | | | | |
|---|---|---|---|---|
| 2,983,292 | A | 5/1961 | McKinley | |
| 3,100,301 | A | 8/1963 | Black | |
| 3,241,585 | A | 3/1966 | Jureit | |
| 3,299,920 | A | 1/1967 | Koenigshof | |
| 4,084,498 | A | 4/1978 | Weaver | |
| 4,170,345 | A | 10/1979 | Townsend | |
| 4,379,426 | A | 4/1983 | Thompson et al. | |
| 4,524,960 | A | 6/1985 | LePoire | |
| 4,627,564 | A | 12/1986 | Bowser | |
| 4,650,106 | A | 3/1987 | Branaman | |
| 5,385,339 | A | 1/1995 | Williams | |
| 5,608,970 | A | 3/1997 | Owen | |
| 5,702,095 | A | 12/1997 | Williams | |
| 5,810,341 | A | 9/1998 | Williams | |
| 5,837,014 | A | 11/1998 | Williams | |
| 5,934,657 | A | 8/1999 | Chauvette | |
| 5,941,514 | A * | 8/1999 | Burcaw | 269/37 |
| 6,042,096 | A | 3/2000 | MacLean | |
| 6,079,325 | A | 6/2000 | LePoire et al. | |
| 6,267,365 | B1 | 7/2001 | Anglin et al. | |
| RE37,797 | E | 7/2002 | Haase | |

OTHER PUBLICATIONS

Gang-Nail Systems, Inc., The Gang-Nail Easy Set System Manual, entitled "*Gang-Nail Easy Set Hardware*", 21 pages (1982).

* cited by examiner

*Primary Examiner*—Robert C. Watson
(74) *Attorney, Agent, or Firm*—Senniger Powers

(57) ABSTRACT

A locator for locating and holding a structural member in engagement with an adjacent structural member at a predetermined position of an assembly apparatus during a truss assembly operation. The locator includes a stop configured for engaging the structural member. A securing device includes a body operatively connected to the stop and a holding member movable relative to the body between an extended position for engaging the assembly apparatus to hold the securing device at a fixed position on the assembly apparatus and a retracted position to release the securing device and enable moving the locator to a different location. The securing device includes a hand-operable actuator for manually moving the holding member between the extended and retracted positions.

13 Claims, 6 Drawing Sheets

PORTABLE LOCATOR FOR ASSEMBLY OF TRUSSES

BACKGROUND OF THE INVENTION

This invention relates generally to the assembly of trusses, and in particular to a locator for holding a structural member at a predetermined position on an assembly apparatus.

Pre-manufactured structural frameworks, such as trusses, are widely used in the construction industry for forming a roof, wall panel, floor, or other building component. Each truss includes a collection of structural members, typically in the form of wooden timbers, held together by connectors, such as connector ("nailing") plates pressed into the timbers. The truss is assembled to the correct specifications at a factory and then shipped to a construction site. A gantry press apparatus is frequently used to facilitate efficient assembly of the truss. It features a table on which the timbers and connector plates are placed at desired relative positions to form the particular truss configuration.

For many trusses including a floor truss, two end stops are used on the table for setting positions of timbers at opposite ends of the truss and for securely holding the truss during assembly. Each end stop provides a flat surface for engaging a timber. Conventionally, a first end stop is an angle bracket which is fastened at a fixed position along a slot in the table. Timbers are typically laid on the table starting from the first end stop and proceeding toward the opposite end. A second end stop is also fastened to the table at the opposite end and is tightened against the endmost timber. Connector plates are placed at locations where adjacent timbers intersect. A motorized roller apparatus (i.e., the gantry) then travels along the table to press integral teeth of the connector plates into the timbers thereby joining them together. The truss is removed and the process is repeated with a new set of timbers.

Unfortunately, the process of fastening end stops can be inefficient. A worker must lean over the table and adjust the second end stop to be tight against the endmost timber and then tighten a fastener or clamp, typically with a wrench, to lock it in position. After the gantry has traveled along the table, the worker must loosen that fastener and pull away the second end stop before the truss can be removed. Some workers have instead adopted a practice of striking the end stop with a hammer to quickly move or rotate it out of the way for removing the truss, which can damage the apparatus.

Another drawback is that conventional end stops are not flexible for use in assembling trusses of various configurations. Typically, there is a single stop on each end which may not be adequately sized for engaging a timber of a larger truss. Some trusses require, for compatibility with certain house wall arrangements, an offset end having two end timbers at spaced lateral positions. The conventional end stop can engage only one timber, and as a result the assembled timbers are subject to inadvertent shifting as the gantry travels along the table. Further, the end stop is not readily portable to a new location. The worker must use the wrench and loosen the fastener before sliding the end stop along a slot, such as to center the stop along a timber, accommodate a new truss, or to remove the stop for use on another table.

Some flat trusses require an opening (known as a "chase") between upper and lower chords which is free from other timbers to permit large heating and cooling ducts to pass through the truss. Unfortunately, timbers at sides of the chase can become slightly misaligned when forming these trusses due to build up of timber length tolerances and imperfections. End stops have not typically been used to strengthen the structure at these positions, partially because of the time necessary for installing and removing the stops.

SUMMARY OF THE INVENTION

Among the several objects and features of the present invention may be noted the provision of a locator for holding a structural member in engagement with an adjacent structural member; the provision of such an apparatus which is readily portable for use at a second location; the provision of such an apparatus which is installed or removed without need for tools or fasteners; the provision of such a locator which facilitates repetitive assembly of multiple trusses; the provision of such a locator which is adjustable for locating the structural member at various preselected positions; the provision of such a locator which holds an end of a truss having offset structural members; and the provision of such a locator which facilitates forming a chase opening with aligned sides.

A portable locator according to the present invention is for locating and holding a structural member in a predetermined position on a worksurface of an assembly apparatus during an assembly operation wherein at least one fastener is installed to connect the structural member to another structural member. In general, the locator comprises a stop configured for engaging the structural member to hold the structural member at its predetermined position on the worksurface. A securing device for securing the stop to the assembly apparatus includes a body operatively connected to the stop and a holding member movable relative to the body between an extended position for engaging the assembly apparatus to hold the securing device at a fixed position on the assembly apparatus and a retracted position to release the securing device and enable moving the locator to a different location.

In another aspect, an assembly apparatus of the present invention is for assembling a truss. The apparatus generally comprises a table for receiving at least two structural timbers to be connected together during an assembly operation wherein at least one fastener is installed to connect the timbers and form the truss. The table has a plurality of parallel slots therein extending in a longitudinal direction. A body has at least a portion configured for being received in one of the slots and is slidably movable along the slot in the longitudinal direction. A stop is for locating and holding one of the timbers in a predetermined position on the table. The stop is operatively connected to the body and configured for engaging the timber to hold the timber at the predetermined position. The stop is movable in translation relative to the body in a direction transverse the longitudinal direction. A securing device is for securing the body at a selected position along the slot. The securing device includes a holding member attached to the body for rotation relative thereto, the holding member being positioned beneath the body. The securing device further includes a spring urging the holding member upward for gripping a lower side of the table.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENT

Figure 1:
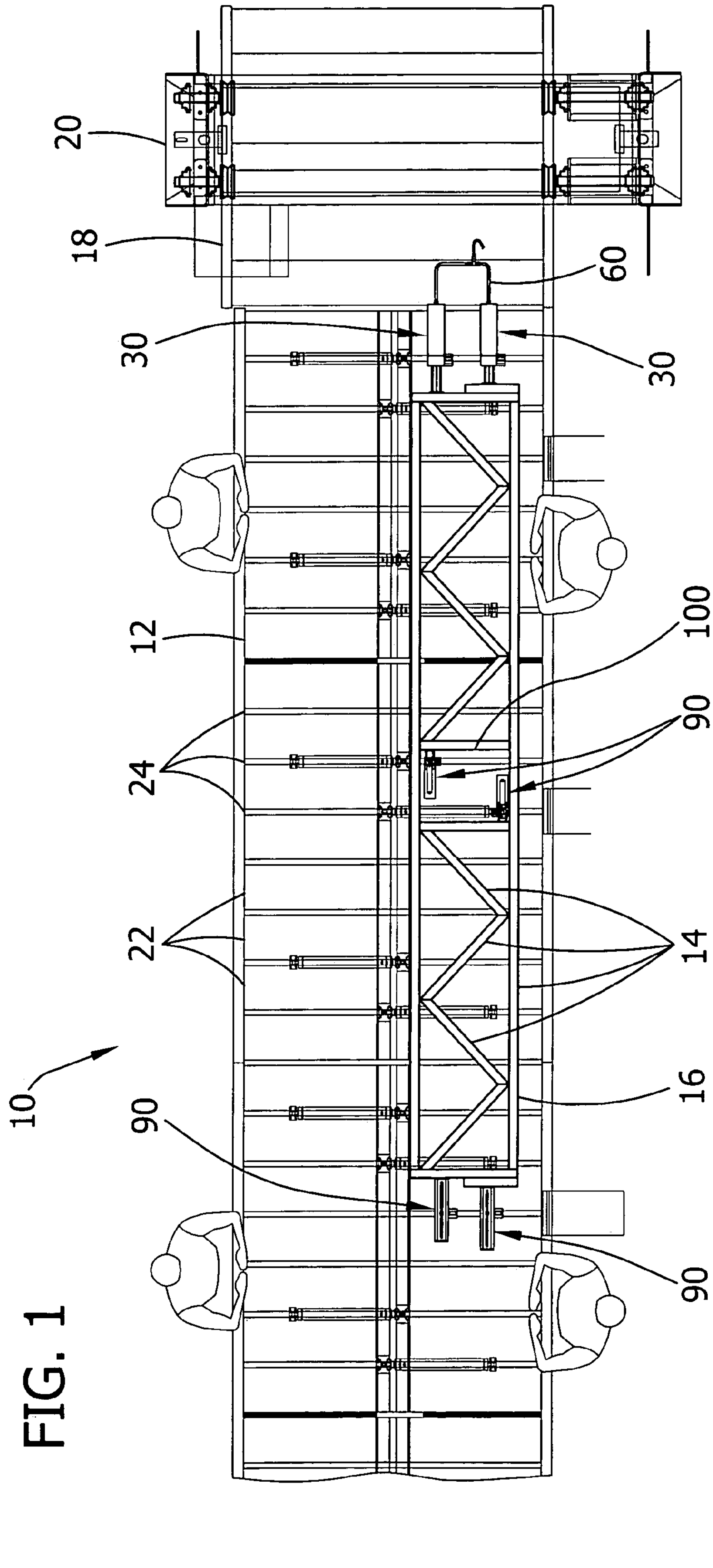
FIG. 1 is a top plan of a truss assembly apparatus with structural members arranged for assembly.
Figure 2:
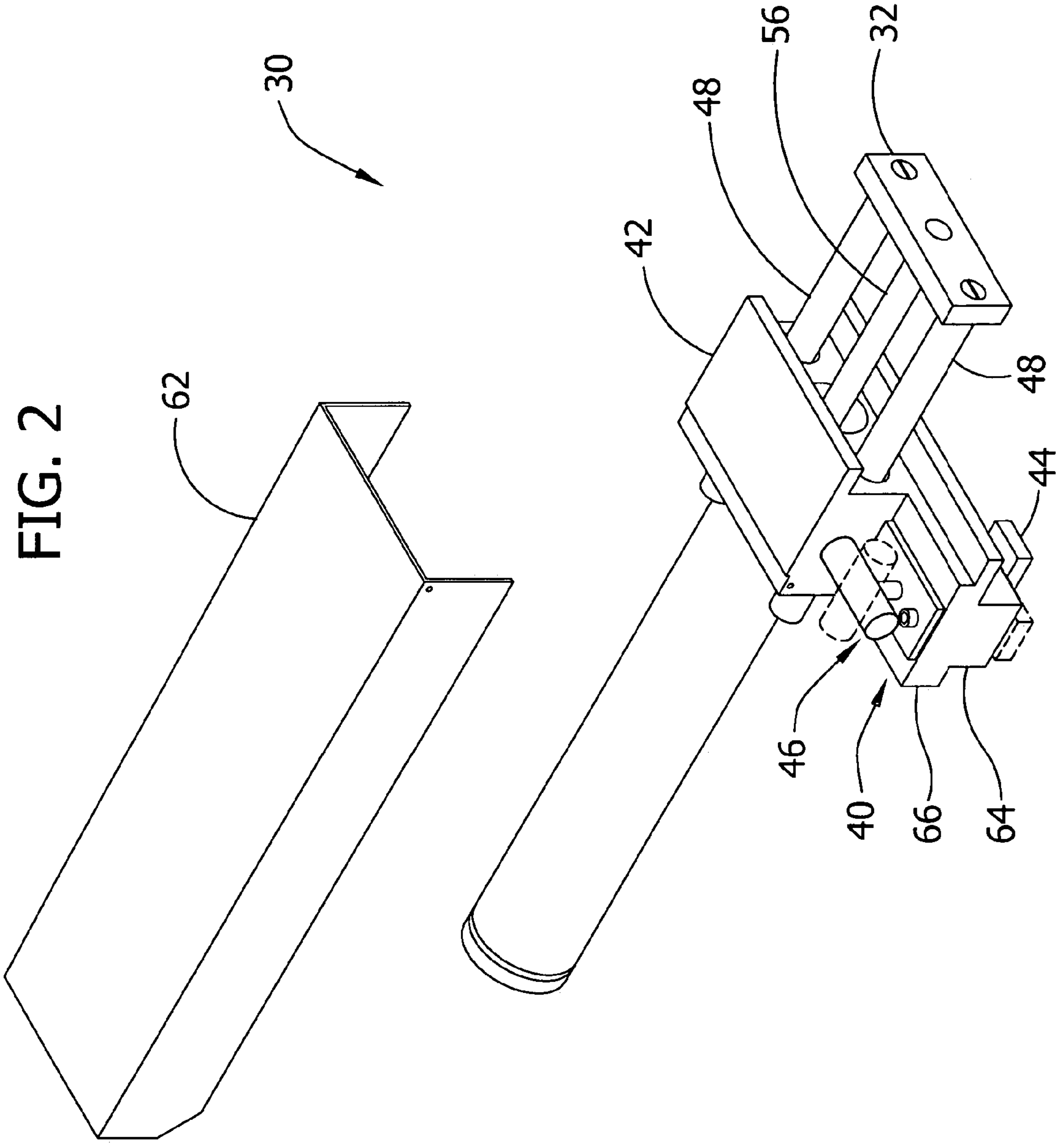
FIG. 2 is a partially exploded perspective showing an adjustable locator of the present invention.

Referring now to the drawings and in particular to FIG. 1, a truss assembly apparatus according to the present invention is indicated generally at 10. The apparatus 10 includes a truss table 12 on which structural members 14 and connector plates (not shown) may be positioned at a desired configuration for assembly to form a truss 16. Outer rails 18 are provided for guiding movement of a roller assembly 20 relative to the truss table 12 to press connector plates into the structural members to connect the structural members. In the illustrated embodiment, the structural members 14 are wooden timbers, but they could be made of other materials (e.g., plastic, steel, etc.) without departing from the scope of the present invention.

The truss table 12 has a plurality of parallel, elongate panels 22 providing a worksurface for placement of timbers 14. A slot 24 is left between adjacent pairs of panels 22 suitable for placement of conventional, cylindrically-shaped positioning stops (not shown). Each stop is slidable in translation along the slot and is capable of being fixed along the slot for correct location and placement of timbers on the worksurface to form a truss. The stops project above the worksurface for guiding positions of the timbers.

Because the truss assembly apparatus 10 is conventional, it will not be described in further detail. Reference is made to co-pending U.S. patent application Ser. No. 10/233,034, filed Aug. 30, 2002 and entitled "Truss Assembly Apparatus," which is hereby incorporated by reference, and to the following U.S. patents for further background regarding truss assembly systems, each of which is also hereby incorporated by reference:

| U.S. Pat. No. | Date | Title |
|---|---|---|
| 5,385,339 | Jan. 31, 1995 | Set-Up Jig For Truss Table |
| 5,702,095 | Dec. 30, 1997 | Truss Table with Integrated Positioning Stops |
| 5,810,341 | Sep. 22, 1998 | Truss Table with Integrated Positioning Stops |
| 5,837,014 | Nov. 17, 1998 | Truss Table with Integrated Positioning Stops |
| 6,079,325 | Jun. 27, 2000 | Trackless Gantry Press System |
| Re 37,797 | Jul. 23, 2002 | Truss Assembly Apparatus with Independent Roller Drive |

A portable locator according to the present invention, indicated generally at 30, is used with the truss assembly apparatus 10 for locating and holding a timber 14 in engagement with an adjacent timber. The locator 30 is particularly suited for use as an end stop, i.e., for holding an endmost timber of a floor truss as shown in FIG. 1. However, it is understood that the locator may be used for holding any structural members at any selected position on the table.

Referring to FIGS. 2–5, the locator 30 includes a stop 32 for engaging a timber and a securing device, indicated generally at 40, for securing the stop to the assembly apparatus 10. The securing device 40 includes a body 42 mounting the stop, a nut 44 which is movable relative to the body for selectively holding the body at a fixed position, and a hand-operable actuator 46.

Figure 3:
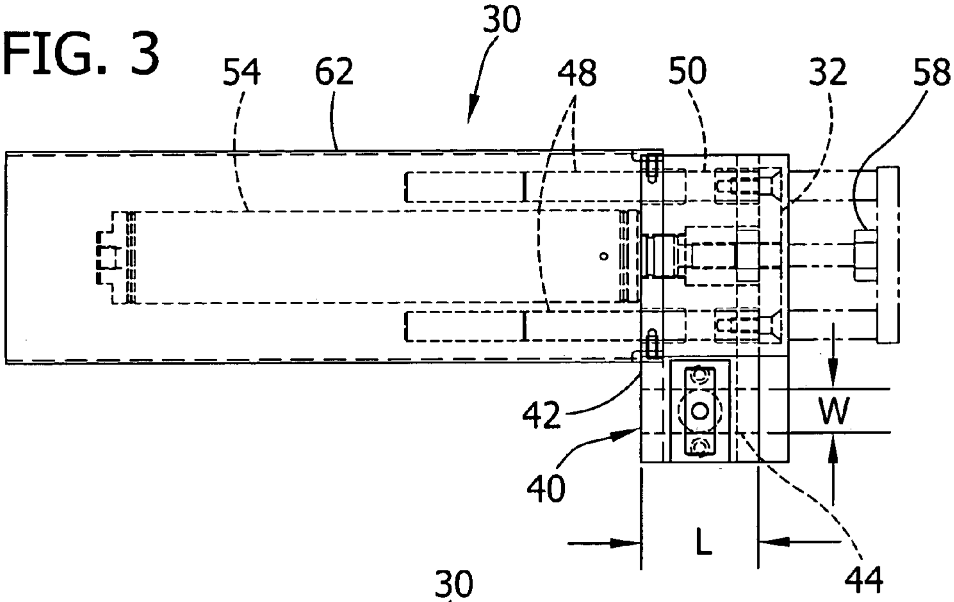
FIGS. 3–5 are a top plan, side elevation, and end elevation, respectively, of the locator of FIG. 1.
Figure 4:
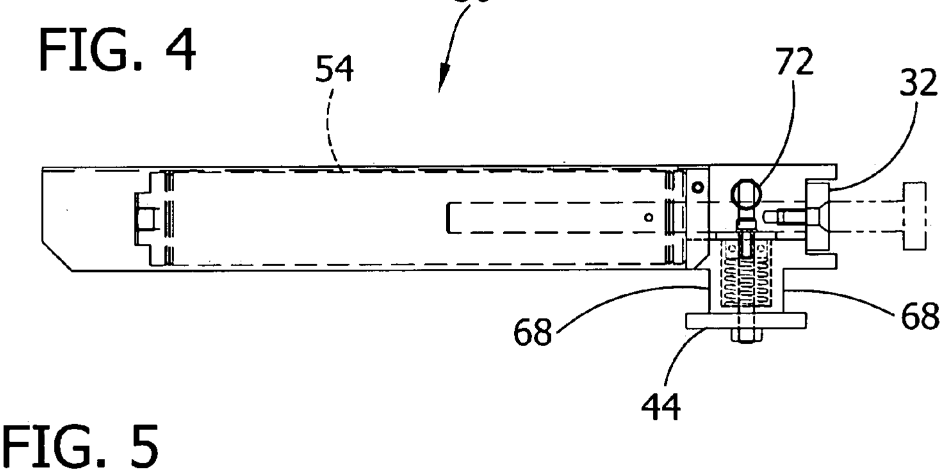

In the illustrated embodiment, the stop 32 comprises a rectangularly shaped bar having a substantially flat outer lateral surface for engaging a timber, although a rounded or curved stop does not depart from the scope of this invention. The stop 32 is mounted on two rods 48 for guiding translational motion of the stop relative to the body 42. As indicated in FIGS. 3 and 4, the stop is movable in translation over a range of positions and between a position adjacent the body and a position spaced from the body. Each guide rod 48 is slidably movable through a corresponding bore 50 in the body. In the illustrated embodiment, each rod 48 has a cylindric shape with a diameter about 0.5 inches and a length about six inches. Each corresponding bore 50 through the body 42 has a length of about two inches and has sleeve bushings at each end having an inner diameter of 0.5 inches reamed to that the rod slides smoothly in the bushing without binding. An end of each rod 48 is drilled and tapped for receiving a threaded fastener for connecting the stop 32 to the rod. It is understood that the stop 32 could be mounted on a fewer or greater number of guide rods of various configurations, or only on a drive with no guide rod, without departing from the scope of this invention.

A cylinder 54 is mounted to the body 42 for moving the stop 32 to a selected position. The cylinder is connected to the stop by a movable drive rod 56 extending from the cylinder and fastened to the stop with a threaded hexagonal fastener 58. In one embodiment, the cylinder 54 is a pneumatic cylinder powered by compressed air delivered through a supply hose 60 (FIG. 1) and controlled by a worker via a control switch (not shown) to move the stop to any selected position. An exemplary cylinder is a stainless steel, pneumatic cylinder having a four inch stroke and made by the Bimba Manufacturing Company of Monee, Ill., USA. However, the cylinder may be of a different type or size, such as hydraulic or electro-mechanical. A cover plate 62 is attachable to the body and is provided for enhancing safety and protecting the cylinder.

The body 42 has a lower projection 64 configured for being received in one of the parallel slots 24 which extend through the worksurface, and an upper part 66 which rests on adjacent panels 22 of the table. The lower projection 64 of the body has parallel sides 68 which align with the slot 24 in a longitudinal direction for being received therein. The stop 32 is movable in translation in a direction generally transverse the longitudinal direction of the body. A typical spacing of the slot 24 is typically about 1.25 inches, and a spacing between sides 68 of the lower projection is about 1.23 inches. Thus the lower projection 64 will fit snugly in the slot but still is loose enough that it can be slid along the slot without binding. The body 42 may be of one piece construction, such as a milled aluminum block, or it may be of multiple parts connected together.

Figure 10:
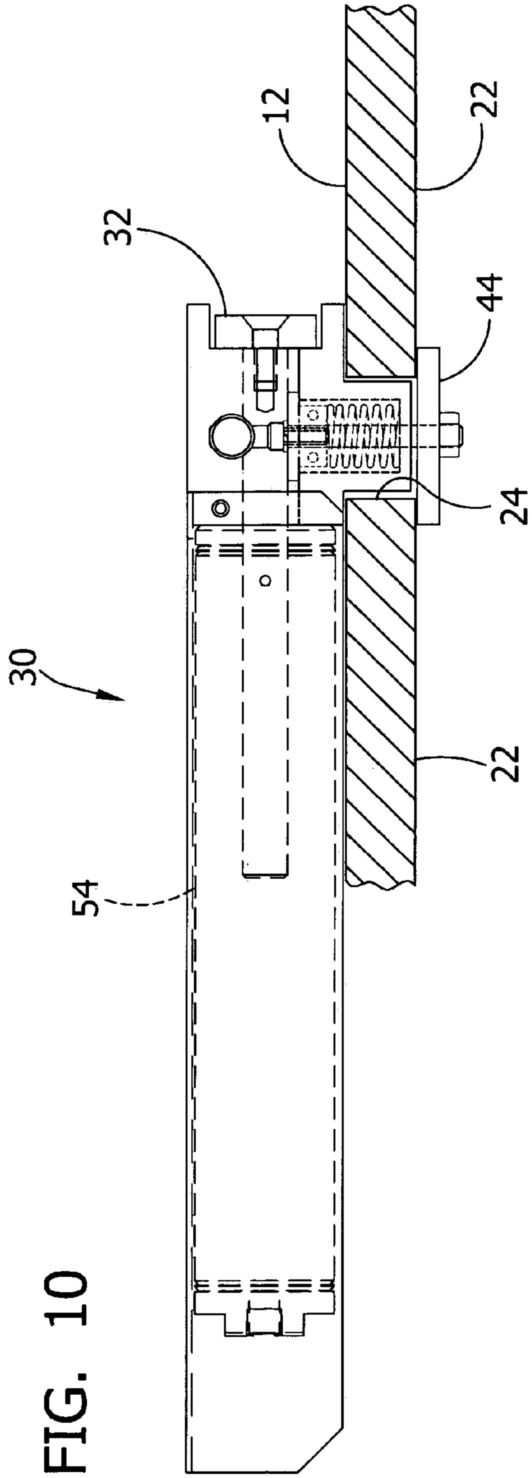
FIG. 10 is a fragmentary section showing the locator of FIG. 2 attached to a truss table.
Figure 11:
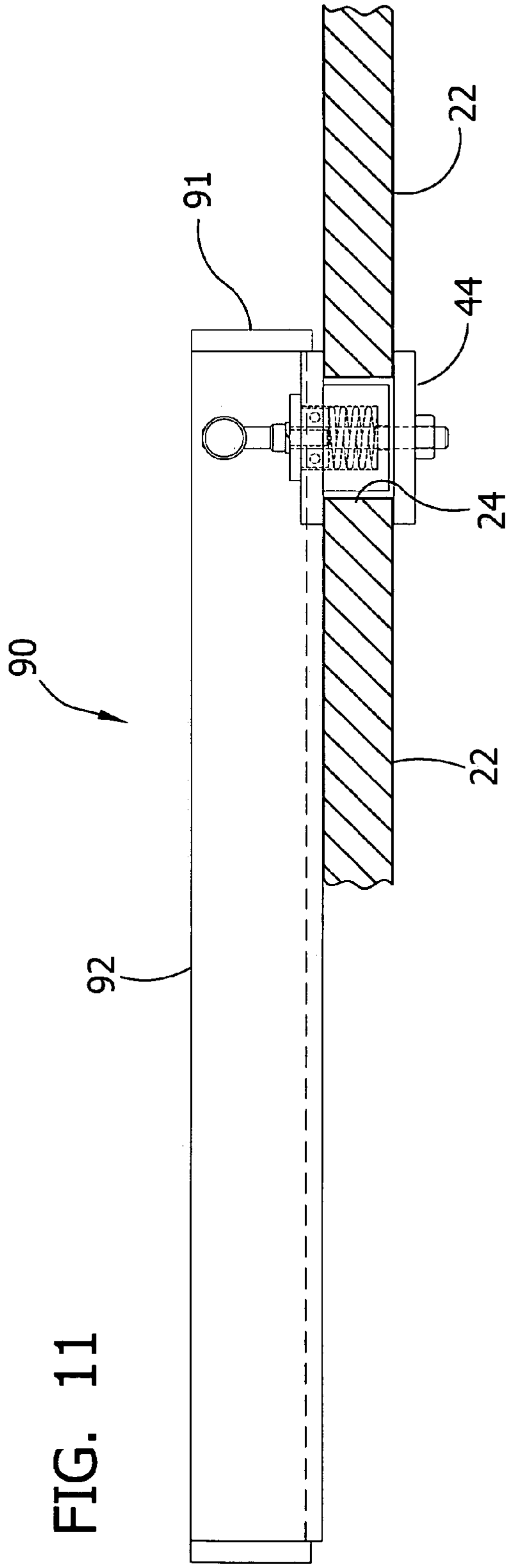
FIG. 11 is a view similar to FIG. 10 showing the locator of the second embodiment.

The nut (broadly, a "holding member" 44), in one embodiment, is a rectangularly-shaped bar which is movable in rotation relative to the body 42. The holding member 44 is positioned generally beneath the body such that when the body is received in the slot, the holding member is below the worksurface. It is movable relative to the body between an extended position for engaging the assembly apparatus 10 to hold the securing device 40 at a fixed position on the assembly apparatus and a retracted position to release the securing device and enable moving the locator 30 to a different location. The holding member 44 has a length L of about 2 inches and a width W of about 0.75 inches. Thus, the width is less than a width or spacing of the slot 24 and the length is greater than the width of the slot. Therefore, when the holding member 44 is oriented with its length generally transverse to the slot as shown in solid on FIGS. 2 and 10 (i.e., the extended position), the locator may not be removed. However when the holding member 44 is oriented with its length parallel to the slot as shown in phantom on FIG. 2 (i.e., the retracted position), the locator may be freely lifted from the slot. It is understood that the holding member could have other shapes or configurations and be movable non-rotatably (i.e., translation) without departing from the scope of this invention.

A spring 70 urges the holding member 44 toward the body 42 for gripping a lower side of the table panels 22 so that the holding member inhibits movement or vibration of the locator when the roller assembly 20 moves along the table. In one embodiment, the spring 70 is a coil compression spring captured within a cavity in the body 42, and has an uncompressed length of about 1.25 inches, outside diameter 0.72 inches, and is formed of 0.072 inch steel wire. Other types and arrangements do not depart from the scope of this invention. The spring 70 may be replaced with another spring having a different size or spring constant to control a magnitude of force urging the holding member toward the body.

Figure 5:
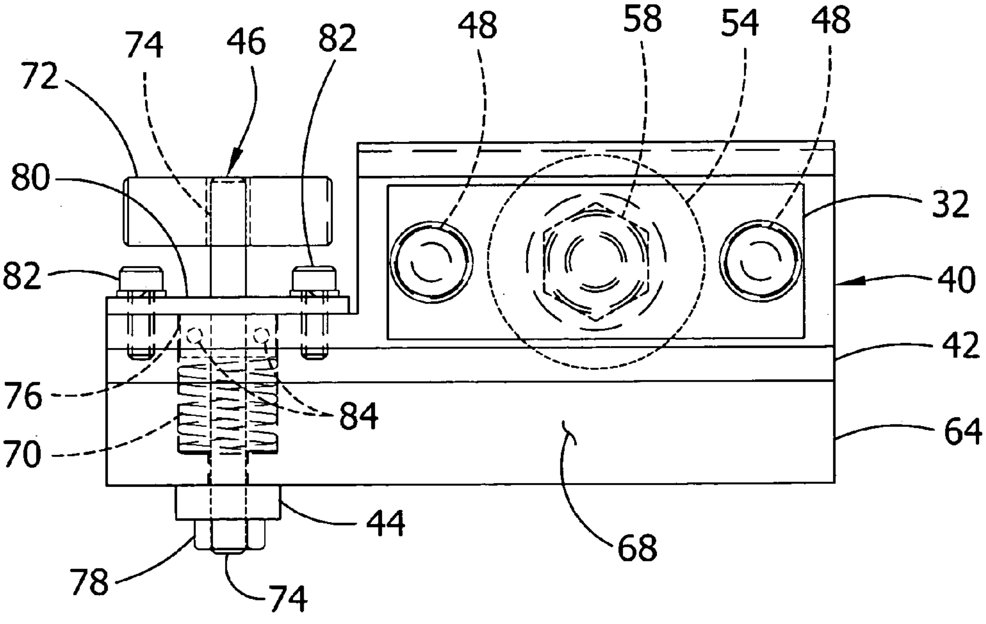
Figure 6:
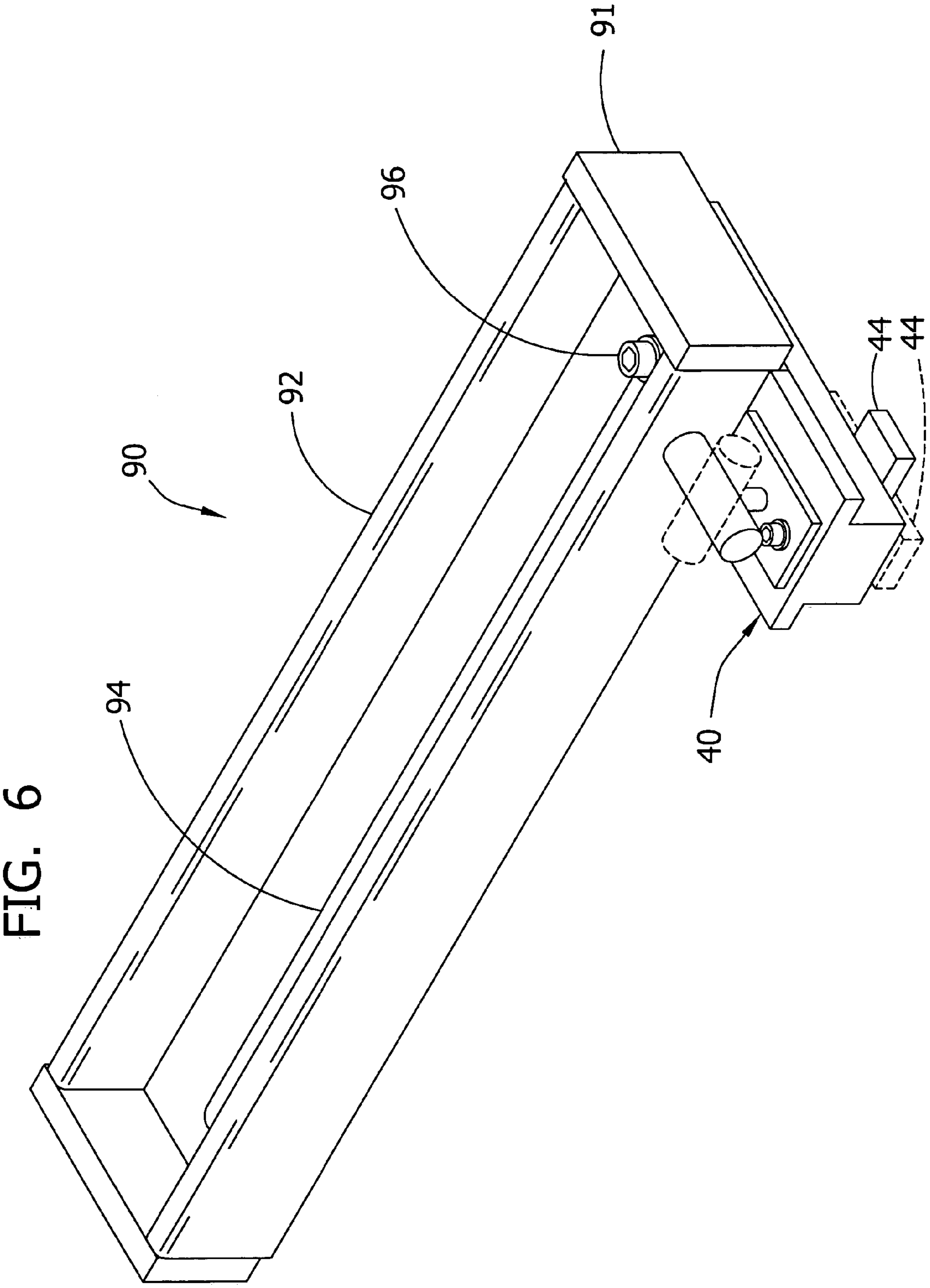
FIG. 6 is a perspective of a locator of a second embodiment.
Figure 7:
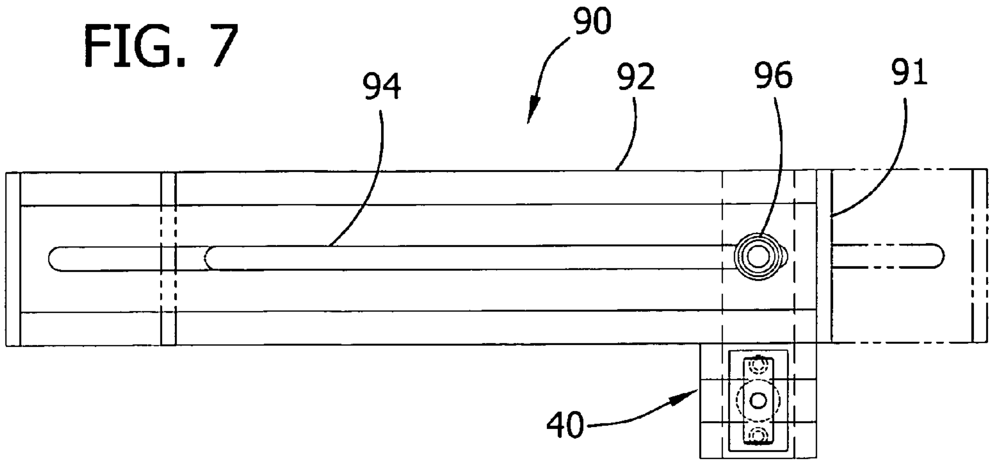
FIGS. 7–9 are a top plan, side elevation, and end elevation, respectively, of the locator of FIG. 6.
Figure 8:
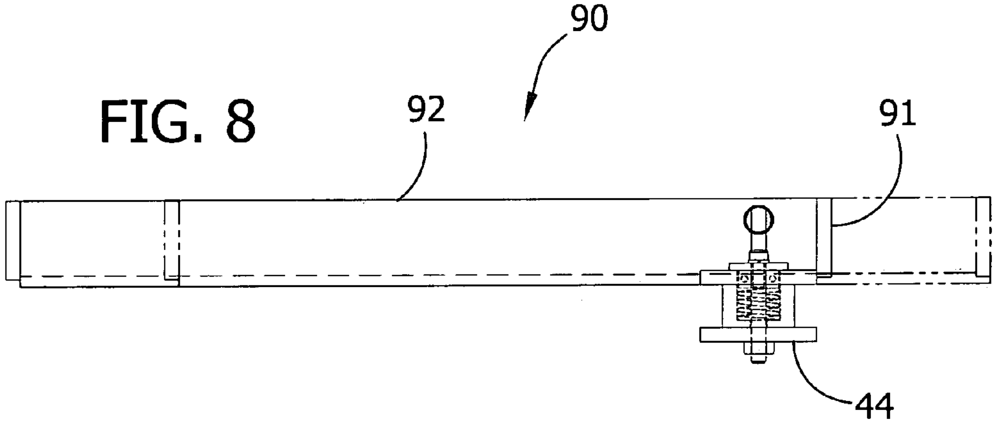
Figure 9:
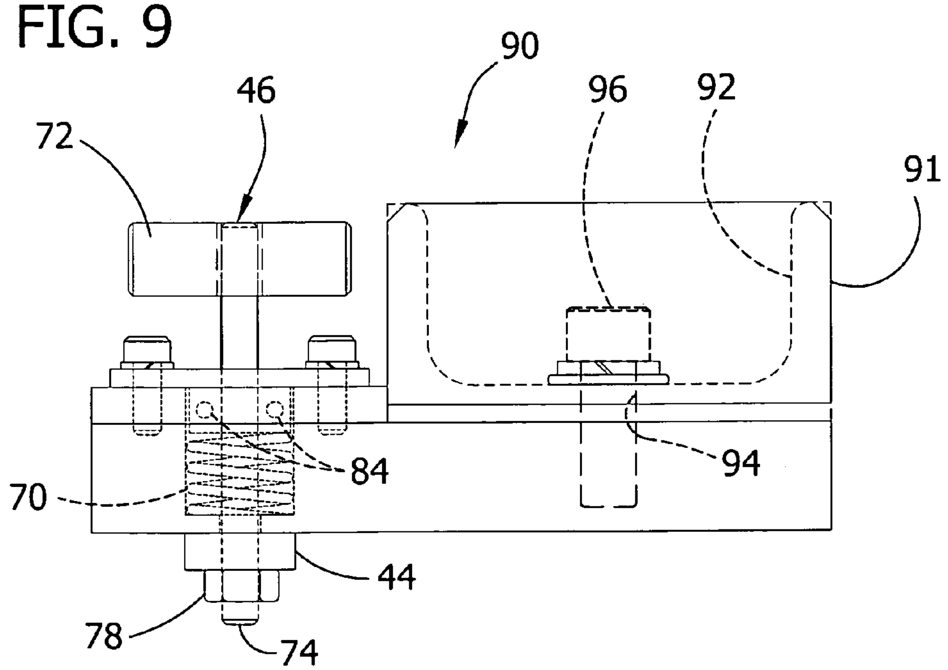

The actuator 46 is hand-operable for manually moving the holding member 44 between the extended and retracted positions. The actuator 46 comprises a handle 72 and a shaft 74 slidably received in the body and connecting the handle and holding member 44. The shaft 74 is rotatable and defines a center of rotation of the holding member. As shown in FIG. 5, a collar 76 is mounted on an upper portion of the shaft 74, and a threaded fastener 78 is mounted on a lower portion of the shaft connecting the holding member to the shaft. The spring 70 is captured in the cavity between the collar 76 and a bottom shoulder of the cavity. The collar is held from upward movement by a plate 80 which is fastened to the body by two fasteners 82. The collar 76 is adjustably movable along the shaft as needed for a differently sized spring 70. Two set screws 84 tighten the collar 76 at a selected position along the shaft 74. The collar is adjusted such that manual force in a downward direction on the handle 72 is sufficient to move the holding member 44 away from the bottom of the table so that the shaft can be rotated.

A locator of a second embodiment of the invention is indicated generally at 90 and shown in FIGS. 6–9 and 11. The second embodiment 90 has an adjustable stop 91 which is manually adjustable. In place of the cylinder, the locator has a U-shaped channel 92 connected to the stop 91 for movement therewith and having an elongate guide slot 94 therein. A fastener 96 is connected to the body 42 and extends through the slot 94 for securing the channel 92 at a selected position relative to the securing device 40. In the illustrated embodiment, the slot 94 has a length of about 12 inches to provide a stroke for the stop 91 of that distance. As many truss tables have a spacing between slots 24 of 11.25 inches, the stop 91 therefore has a reach beyond a slot adjacent to the slot in which the body is mounted. That is particularly valuable when one slot 24 is damaged or obstructed such that the locator cannot be positioned in a slot which would otherwise be favored.

Referring now to FIG. 1, the locators of the first and second embodiment 30, 90 may be simultaneously used during a truss assembly process. Of course, the locators of the present invention may be used in conjunction with conventional end stops as well. In operation, the worker installs a locator of the present invention on a first end of the table. The size of the stop 32 (or stop 91) and in particular its length may be chosen as needed for the truss which is being assembled. A single locator may be used, or multiple locators having stops with the same or different lengths may be installed for particularly tall trusses. For example, two locators with stops of 3 and 5 inch lengths or 6 and 6 inch lengths may be used in combination. As shown in FIG. 1, multiple locators are beneficial for assembling a truss having an offset end, as stops securely hold both end timbers at different lateral positions. For installation, the worker places the lower projection 64 of the body into the slot 24 at a selected location. The worker presses down on the handle 72 against the force of the spring 70 to release the holding member 44 from engagement with the lower projection in the retracted position. Then the worker rotates the handle about ninety degrees to change the orientation of the holding member 44 to the extended position, and releases the handle so that the force of the spring 70 moves the holding member up to grip the lower side of the table 12. If it is necessary to adjust the position or move a locator 30 or 90, it is readily portable without using a tool to loosen and tighten any fastener. The locator may be manually moved very quickly.

Timbers 14 are laid on the table for forming the chords and then for forming webs starting from the first end and proceeding toward the second, opposite end. Connector plates are placed at locations where adjacent timbers intersect. At one end, the workers operate the powered cylinder (s) 54 to press the stop(s) 32 against the endmost timbers and securely hold the truss in position. The arrangement of FIG. 1 has two locators 30 of the first embodiment (powered) on one end, with two locators 90 of the second embodiment (manual) on the opposite end. It is understood that any combination of locators or conventional stops may be used and does not depart from the scope of this invention. Timbers along sides of a central chase opening 100 may be secured in aligned position by locators of the present invention. These locators can be quickly installed and removed due to the advantages of the securing device 40.

The motorized roller apparatus 20 (i.e., the gantry) then travels along the table to press integral teeth of the connector plates into the timbers 14 thereby joining them together. The truss 16 is removed for repeating the process with a new set of timbers. The worker may remain remote from the locator in controlling the cylinder 54 to release the pressing force on the truss. It may then be lifted from the table.

Significantly, the locator also facilitates efficient repetitive assembly of multiple trusses of the same size and configuration. The worker does not need to loosen any fasteners before removing the first truss, nor tighten any fasteners after laying timbers for the second truss. The powered cylinder 54 of a locator on one side of the truss is operated to move the stop 32 toward or away from the timbers. Other stops at other locations do not need to be moved.

In view of the above, it will be seen that the several objects of the invention are achieved and other advantageous results obtained. The locator may be used with existing equipment of a truss assembly apparatus to press a structural member into engagement with an adjacent structural member. The locator may be installed or removed from the apparatus without the need for tools or fasteners. The locator is portable, may be secured to the apparatus without fixed attachment, and is reliable in operation.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A portable locator for locating and holding a structural member in a predetermined position on a worksurface of an assembly apparatus during an assembly operation wherein at least one fastener is installed to connect the structural member to another structural member, the locator comprising:

a stop configured for engaging the structural member to hold the structural member at its predetermined position on the worksurface; and a securing device for securing the stop to the assembly apparatus, the securing device including a body operatively connected to the stop and a holding member movable relative to the body between an extended position for engaging the assembly apparatus to hold the securing device at a fixed position on the assembly apparatus and a retracted position to release the securing device and enable moving the locator to a different location, the holding member being attached to the body for rotation relative thereto;

and wherein the securing device further includes a hand-operable actuator for manually moving the holding member between the extended and retracted positions, the actuator comprising a handle and a shaft slidably received in said body and connecting the handle and holding member, the shaft being rotatable with respect to the body.

2. A portable locator as set forth in claim 1 wherein the body of the securing device has a lower projection configured for being received in one of a plurality of parallel slots extending through the worksurface, and wherein the holding member is positioned generally beneath the body such that when the lower projection is received in said slot, the holding member is below the worksurface.

3. A portable locator as set forth in claim 2 wherein said lower projection which aligns with said slot when received therein, and wherein the holding member comprises and elongate nut having a width less than a width of said slot and a length greater than the width of said slot.

4. A portable locator as set forth in claim 2 wherein the securing device further comprises a spring urging the holding member toward the body for gripping the assembly apparatus.

5. A portable locator as set forth in claim 4 wherein the actuator further comprises a collar attached to the shaft and the body includes a cavity with an internal shoulder, and wherein the spring is captured in the cavity between said collar and said shoulder.

6. A portable locator as set forth in claim 5 wherein the holding member comprises a rectangularly-shaped nut.

7. A portable locator as set forth in claim 1 wherein the stop is mounted for translational movement relative to the securing device to thereby selectively adjust said predetermined position of the structural member on the worksurface.

8. A portable locator as set forth in claim 7 further comprising a powered cylinder for moving the stop.

9. A portable locator as set forth in claim 8 further comprising at least one rod for guiding said translational movement of the stop, the rod being connected to the stop and slidably movable relative to the body.

10. A portable locator as set forth in claim 7 further comprising a channel connected to the stop for guiding translational movement of the stop, the channel having an elongate guide slot therein, and a fastener extending through the slot configured for securing the channel at a selected position relative to the securing device.

11. An assembly apparatus for assembling a truss, comprising:

a table for receiving at least two structural timbers to be connected together during an assembly operation wherein at least one fastener is installed to connect the timbers and form said truss, the table having a plurality of parallel slots therein extending in a longitudinal direction;

a body having at least a portion configured for being received in one of said slots and being slidably movable along said slot in said longitudinal direction;

a stop for locating and holding one of said timbers in a predetermined position on the table, the stop being operatively connected to the body and configured for engaging the timber to hold the timber at said predetermined position, the stop being movable in translation relative to the body in a direction transverse the longitudinal direction; and a securing device for securing the body at a selected position along the slot, the securing device including a holding member attached to the body for rotation relative thereto, the holding member being positioned beneath the body;

wherein the securing device further includes a spring urging the holding member upward for gripping a lower side of the table.

12. An assembly apparatus as set forth in claim 11 wherein the holding member is movable relative to the body between an extended position for engaging the table to hold the body at said selected position and a retracted position to release the table and enable moving the locator to a different location.

13. A portable locator for locating and holding a structural member in a predetermined position on a worksurface of an assembly apparatus during an assembly operation wherein at least one fastener is installed to connect the structural member to another structural member, the locator comprising:

a stop configured for engaging the structural member to hold the structural member at its predetermined position on the worksurface; and a securing device for securing the stop to the assembly apparatus, the securing device including a body opera tively connected to the stop and a holding member movable relative to the body between an extended position for engaging the assembly apparatus to hold the securing device at a fixed position on the assembly apparatus and a retracted position to release the securing device and enable moving the locator to a different location;

wherein the stop is mounted for translational movement relative to the securing device to thereby selectively adjust said predetermined position of the structural member on the worksurface.

* * * * *